(12) United States Patent
Achour et al.

(10) Patent No.: US 11,196,156 B2
(45) Date of Patent: Dec. 7, 2021

(54) FIXED WIRELESS SYSTEMS AND METHODS INCORPORATING A BEAM STEERING ANTENNA

(71) Applicant: Metawave Corporation, Palo Alto, CA (US)

(72) Inventors: Maha Achour, Palo Alto, CA (US); Matthew Harrison, Palo Alto, CA (US); Bernard Casse, Palo Alto, CA (US)

(*) Notice: Subject to any disclaimer, the term of this patent is extended or adjusted under 35 U.S.C. 154(b) by 0 days.

(21) Appl. No.: 16/354,120

(22) Filed: Mar. 14, 2019

(65) Prior Publication Data

US 2019/0326668 A1  Oct. 24, 2019

Related U.S. Application Data

(60) Provisional application No. 62/643,114, filed on Mar. 14, 2018.

(51) Int. Cl.
| | |
|---|---|
| *H04W 24/00* | (2009.01) |
| *H01Q 3/00* | (2006.01) |
| *H01Q 1/24* | (2006.01) |
| *H04W 16/28* | (2009.01) |
| *H01Q 21/00* | (2006.01) |
| *H04W 24/04* | (2009.01) |
| *H04W 24/02* | (2009.01) |
| *H04W 88/10* | (2009.01) |
| *H01Q 3/36* | (2006.01) |

(52) U.S. Cl.
CPC ............ *H01Q 3/005* (2013.01); *H01Q 1/246* (2013.01); *H01Q 21/0025* (2013.01); *H04W 16/28* (2013.01); *H04W 24/02* (2013.01); *H04W 24/04* (2013.01); *H01Q 3/36* (2013.01); *H04W 88/10* (2013.01)

(58) Field of Classification Search
None
See application file for complete search history.

(56) References Cited

U.S. PATENT DOCUMENTS

| | | | |
|---|---|---|---|
| 9,648,547 B1* | 5/2017 | Hart | ............ H04W 48/10 |
| 2004/0033784 A1* | 2/2004 | Kojima | ............ H04B 7/15542 |
| | | | 455/73 |
| 2009/0250262 A1* | 10/2009 | Jin | ............ H01F 17/0006 |
| | | | 174/384 |

(Continued)

OTHER PUBLICATIONS

D. Patron, "Compact Reconfigurable Antennas for Wireless Systems and Wearable Applications," Ph.D. dissertation, Dept. of Electrical and Computer Eng., Drexel University, Philadelphia, PA, May 2015.

(Continued)

*Primary Examiner* — Suhail Khan
(74) *Attorney, Agent, or Firm* — Sandra Lynn Godsey

(57) ABSTRACT

Examples disclosed herein relate to a node in a fixed wireless network. The node includes a Beam Steering Antenna Module ("BSAM") having a beam steering antenna to generate RF beams at controlled directions, and an antenna controller to control the directions of the generated RF beams. The node also includes a transceiver control having an Optimal Path Module ("OPM") to determine data paths in the fixed wireless network and direct the antenna controller according to the determined data paths.

20 Claims, 8 Drawing Sheets

(56) References Cited

U.S. PATENT DOCUMENTS

| | | | | |
|---|---|---|---|---|
| 2014/0357319 A1* | 12/2014 | Maltsev | ............... | G01S 3/38 455/562.1 |
| 2016/0021671 A1 | 1/2016 | Gulati et al. | | |
| 2017/0310511 A1* | 10/2017 | Byun | ............... | H04B 7/0452 |
| 2018/0020440 A1* | 1/2018 | Stuck | ............... | H04B 7/0617 |
| 2018/0123674 A1* | 5/2018 | Freedman | ........... | H01Q 3/2682 |
| 2018/0138590 A1* | 5/2018 | Uchida | ............. | H04B 7/0619 |
| 2019/0386713 A1* | 12/2019 | Yoshioka | ........... | H04L 27/26 |

OTHER PUBLICATIONS

G. Augustin, et al., "Compact Dual-Band Antenna for Wireless Access Point," in Electronics Letters, vol. 42, issue 9, pp. 502-503, Apr. 2006.

D.-H. Tseng et al., "A Low-Cost 60-GHz Switched-Beam Patch Antenna Array With Butler Matrix Network," in IEEE Antennas and Wireless Propagation Letters, vol. 7, pp. 432-435, Jul. 2008.

A. Tall et al.,"Multilevel beamforming for high data rate communication in 5G networks," in ArXiv 2015, abs/1504.00280, pp. 1-20, Oct. 2015.

P. Marini, "The role of beamforming in 5G: and how to test it," The International Wireless Consortium, IWPC workshop on 5G New Radio Evolution Towards 2020, Madrid, Spain, May 2017.

J. Ala-Laurinaho, et al., "2-D Beam-Steerable Integrated Lens Antenna System for 5G E-Band Access and Backhaul," in IEEE Transactions on Microwave Theory and Techniques, vol. 64, No. 7, p. 2244-2255, Jul. 2016.

T.E. Bogale et al., "Machine Intelligence Techniques for Next-Generation Context-Aware Wireless Networks," ITU Journal: ICT Discoveries, Special Issue No. 1, pp. 1-11, Feb. 2018.

L.-Y. Ji et al., "A reconfigurable beam-scanning partially reflective surface (PRS) antenna," 2015 9th European Conference on Antennas and Propagation (EuCAP), Lisbon, pp. 1-3, Apr. 2015.

L.-Y. Ji et al., "Pattern reconfigurable Fabry-Perot cavity antenna," 2015 International Symposium on Antennas and Propagation (ISAP), Hobart, Australia, pp. 1-3, Nov. 2015.

M. G. Kibria et al., "Big Data Analytics, Machine Learning, and Artificial Intelligence in Next-Generation Wireless Networks," in IEEE Access, vol. 6, p. 32328-32338, May 2018.

P. Hindle, et al., "5G Semiconductor Solutions—Infrastructure and Fixed Wireless Access," Microwave Journal E-Book, Jul. 2018.

* cited by examiner

FIXED WIRELESS SYSTEMS AND METHODS INCORPORATING A BEAM STEERING ANTENNA

CROSS-REFERENCE TO RELATED APPLICATIONS

This application claims priority to U.S. Provisional Application No. 62/643,114, filed on Mar. 14, 2018, and incorporated herein by reference.

BACKGROUND

New generation wireless networks are increasingly becoming a necessity to accommodate user demands. Mobile data traffic continues to grow every year, challenging the wireless networks to provide greater speed, connect more devices, have lower latency, and transmit more and more data at once. Users now expect instant wireless connectivity regardless of the environment and circumstances, whether it is in an office building, a public space, an open preserve, rural and remote locations, or a vehicle. In many of these environments, fixed wireless networks have been successfully deployed to provide broadband access and increased connectivity. These networks can be configured to connect homes, business, and mobile devices with the Internet and/or with each other, cloud networks, and so forth.

A fixed wireless network allows users to send and receive data between two fixed sites. The fixed wireless network may incorporate one or multiple central transmission points and may be used to implement various communication and data transmission scenarios, including point-to-point, point-to-multipoint, or even multipoint-to-multipoint. Going forward, fixed wireless networks will operate at higher frequencies, such as in the 24, 39, 60 and 70 GHz ranges, and be compatible with the upcoming 5G standard. These higher frequencies provide narrow wavelengths in the range of ~1 to 10 millimeters and have a short range (just over a kilometer), and therefore require specialized high frequency capable components and antennas to realize all the promises of broadband, 5G communications.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Fixed wireless systems and methods incorporating a beam steering antenna are disclosed. The systems and methods support the growing demands of wireless communications in the millimeter wave spectrum and enable the deployment of 5G connectivity to users. In various examples, nodes of a fixed wireless network are equipped with a novel Beam Steering Antenna Module ("BSAM") capable of generating desired beam forms and controlling the direction of beams transmitted throughout the network based on an optimal path between any two pairs of nodes. The beam forms are generated with a beam steering antenna that is dynamically controlled such as to change its electrical or electromagnetic configuration with frequency and spatial dispersion to enable beam steering. The dynamic control is at the direction of an optimal path module that determines the optimal data paths in the fixed wireless network subject to latency, bandwidth, and computational constraints.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
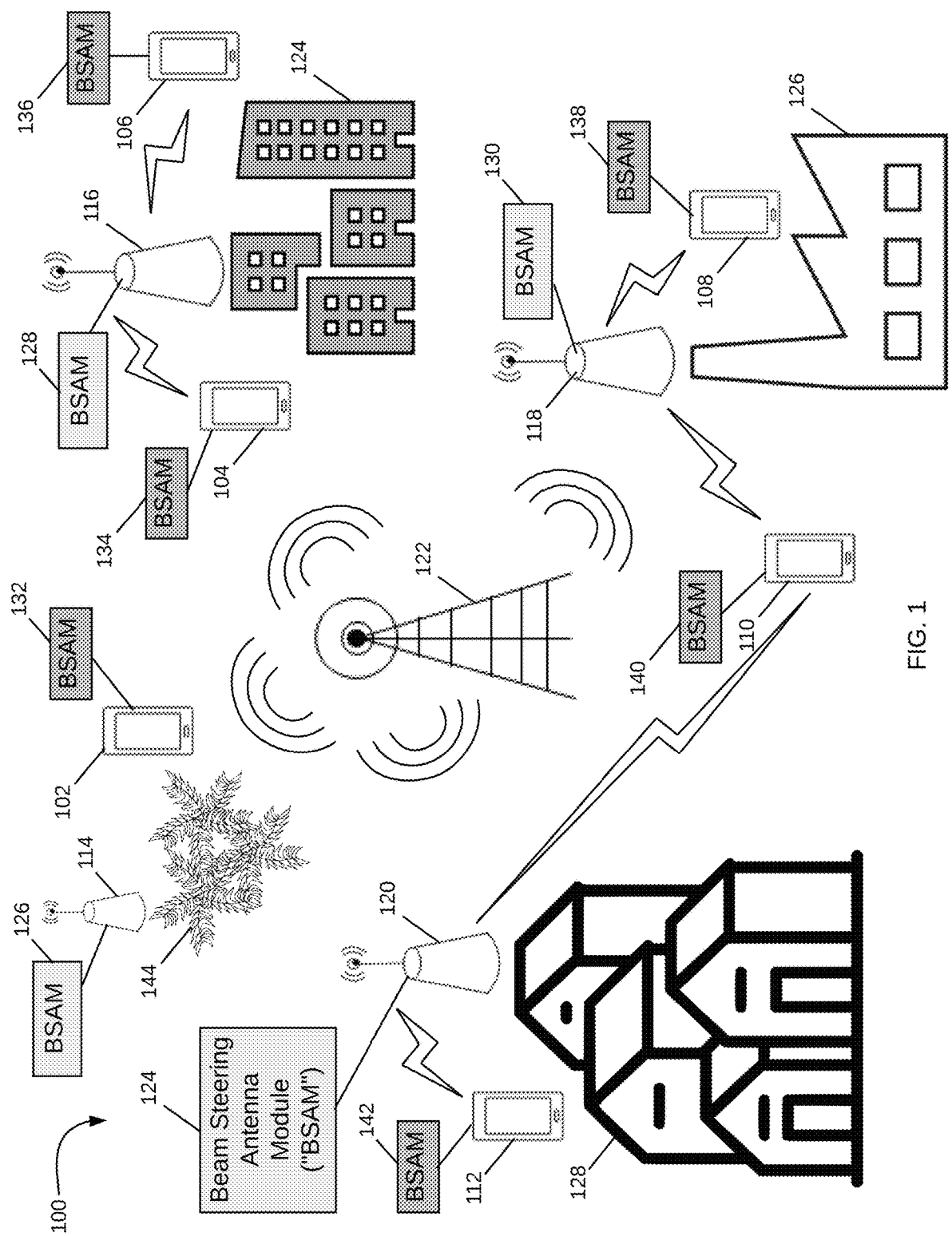
FIG. 1 illustrates a fixed wireless network in accordance with various examples.

FIG. 1 illustrates a fixed wireless network in accordance with various examples. Fixed wireless network 100 is a network capable of arranging and coordinating communications to a number of end users' devices, which in a cellular system are commonly referred to as User Equipment ("UE"). A UE, such as UE 102-112, communicates to other UE in the network 100 and outside of the network 100 through a base station or central unit 122 and one or more Fixed Wireless Radios ("FWRs") housed in fixed physical locations in the network. In various scenarios, FWRs may be positioned atop different kinds of buildings or group of buildings and structures to service UE in that environment. For example, FWR 116 is positioned atop a group of commercial buildings 124, FWR 118 is positioned atop a factory, manufacturing or industrial facility 126, and FWR 120 is positioned atop a building in a residential community 128. FWRs may also be positioned throughout an area, such as FWR 114 positioned near a tree 144.

Each FWR 114-120 is equipped with a Beam Steering Antenna Module ("BSAM"), e.g., BSAM 124 in FWR 120, BSAM 126 in FWR 114, BSAM 128 in FWR 116, and BSAM 130 in FWR 118. As described in more detail hereinbelow, BSAMs 124-130 include a beam steering antenna capable of generating focused and high-power beams to a desired direction. The direction can be controlled to enable optimal paths between nodes in the fixed wireless network 100. Each network node may be an FWR or a UE. In various examples, UE 102-112 may also include a BSAM, e.g., BSAMs 132-142, for directing beams to desired directions in an optimal path. The BSAMs 124-130 and BSAMs 132-142 need not be implemented the same way, as the communication and circuitry design requirements for UE 102-112 and FWRs 114-120 may be different.

FWRs 114-120 may be used to implement various communication and data transmission scenarios, including point-to-point, point-to-multipoint, or even multipoint-to-multipoint. Use of FWRs 114-120 reduces the overall cost of providing wireless connectivity to UE 102-112, as they require less overhead infrastructure. FWRs 114-120 also provide flexibility in expanding service according to the growing demand for wireless communications, which is outpacing traditional systems, such as the current wireless Internet Service Provider ("ISP") networks. While traditional systems are beneficial to underserved areas, they are not keeping pace with the exponential growth of wireless services as they would need infrastructure build out.

Additionally, ISPs deploy wireless communications in the unlicensed frequency spectrum, which is where Wi-Fi also operates. These license-free frequencies use low power transmissions, are used by other services, and are therefore prone to interference degradation. Wireless ISP systems also do not have consistent bandwidth as they are susceptible to many conditions including changing weather. These ISP systems are expensive to build and maintain. As wireless applications are moving to the high-band, high-capacity millimeter wave spectrum, ISP providers are looking to replace cable, such as used for Internet connection, with fixed wireless solutions specified to operate at millimeter wave lengths.

Fixed wireless networks are targeted to transmit to multi-user networks while providing over 100 Mbps to a home or small business and small cellular cells concurrently through a wireless link from a stationary location. Such networks are able to realize ubiquitous broadband communications and enable new features such as massive Multiple Input, Multiple Output ("MIMO") devices, carrier aggregation of signals, directed connectivity, modularity expanded networks, and so forth, and are potential solutions for the developing 5G wireless standards for cellular. These new standards and specifications are demanding, but reflect the way data is heavily consumed via wireless networks today.

Some fixed wireless networks look to incorporate small cell units that connect to a wireless network through a wireless backhaul. These cells, such as FWRs 114-120, are to cover small well-traveled areas in buildings, industrial sites, residential communities, malls, hotels, and so forth. The goal for deployment is two-fold: connect the small cells to power and maximize the area coverage and capacity of these cells.

Figure 2:
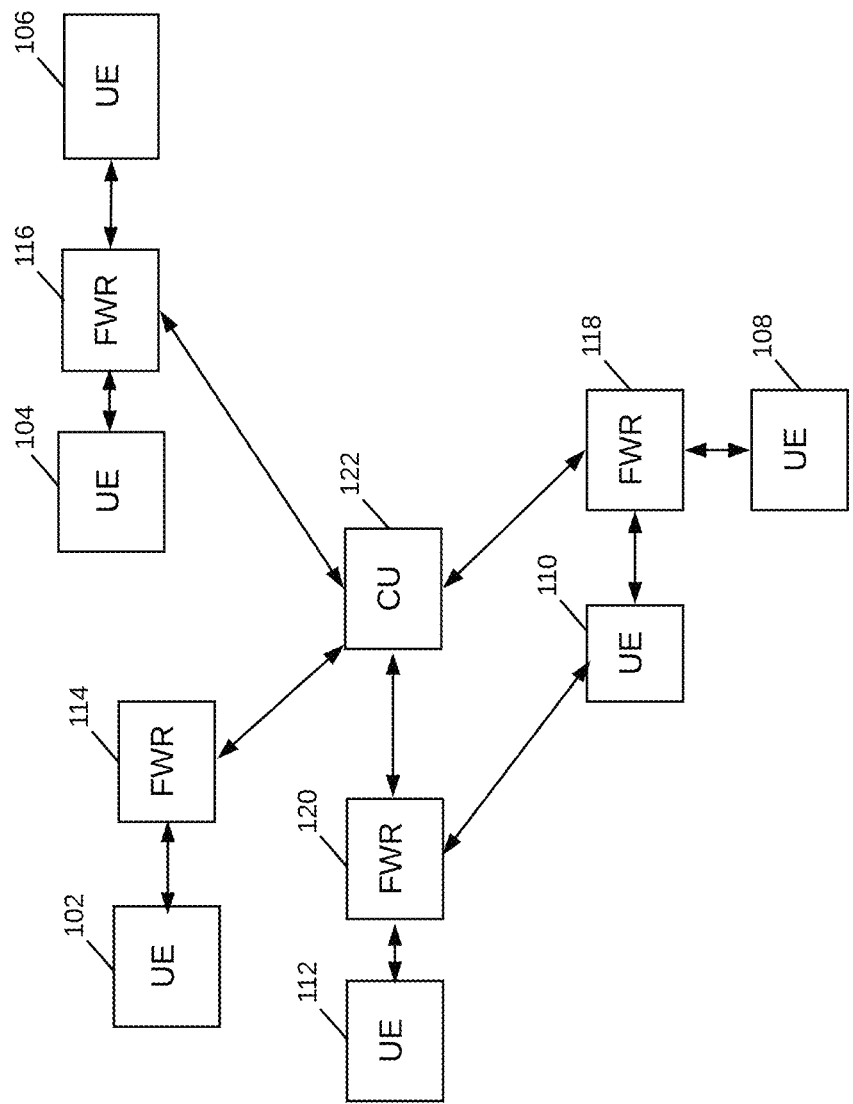
FIG. 2 is a schematic diagram illustrating the connections in the fixed wireless network of FIG. 1.

Each FWR 114-120 services a group of UE within its reachable, local environment or cell: FWR 114 services UE 102, FWR 116 services UE 104-106, FWR 118 services UE 108-110, and FWR 120 services UE 112. In some scenarios, a given UE is positioned to communicate with multiple FWRs or travels in the coverage area of multiple FWRs, such as UE 110 communicating with FWRs 118-120. The backhaul channel to each of the FWRs 114-120 is wireless, supporting communications of each FWR to corresponding UE through access channels. In other examples, each FWR 114-120 may be connected to a local router or routing switch in its local environment to provide a wired backhaul link, while the individual UE continues to communicate to the FWRs via wireless access channels. FIG. 2 illustrates the connections between the FWRs 114-120, base station or Central Unit ("CU") 122 and UE 102-112 for clarity.

In some examples, fixed wireless network 100 is a fronthaul network that connects to one or multiple backhaul networks through a core network. A fronthaul network is a network architecture incorporating centralized baseband controllers, e.g., base station 122, and remote standalone nodes at cell sites, e.g., FWR 114-120. The core network in some examples is also referred to as a Mobile Switching Center ("MSC"), as it performs authentication, admission control, traffic control, and network support, as well as other system functions. The backhaul networks may provide voice, data or other services, such as Internet, telephone, emergency services, and so forth. Wireless networks such as fixed wireless network 100 connect to backhaul networks to extend service capabilities and geographic coverage.

The antennas in the BSAMs used for wireless communication in fixed wireless network 100 are specified to support the specific types of communications desired. The ability for the antenna structures to control beam shaping and beam shifting is also dependent on use, but to promote flexibility, these goals are continually requiring more directionality control and smaller size antennas. The antennas incorporated in BSAMs 124-142 provide foundational technologies for the next generation of wireless communications. These antennas are not limited to fixed wireless networks such as network 100 but are applicable in a wide variety of areas, including mobile communications in 5G, as these changes require more than just upgrading of cellular network sites.

It is appreciated that the configuration of fixed wireless network 100 is flexible and may be built so as to optimize the coverage and use cases within an area of focus. Fixed wireless network 100 may be used to extend current infrastructure, meet the individual needs of the communities it serves, and provides end-to-end solutions for 5G transmission. The fixed wireless solutions discussed herein are operating at the millimeter wave spectrum band, and may be implemented in other bands depending on capabilities and availability of components. For example, a 5G system may operate at approximately 30 GHz, enabling 5G access, home routers virtualized networks, and others.

Virtualized networks may include Virtualized Radio Access Networks ("vRANs"), which are specified to respond in real time to an RF signal. In various examples, base station or central unit 122 may be positioned in a data center and linked to FWRs 114-120 to service small cells, with packetized RF signals mimicking Ethernet signals and packets, including address information. The fixed wireless network is able to receive a signal from any source and route it to any FWR; the signal may be cellular, Wi-Fi, and so on. The vRAN units and virtualized central units may be positioned at both ends of the connections. These systems may develop around cloud computing capabilities and maximize efficiencies for the growing demands of the Internet of Things ("IoT") and 5G generally. These fixed wireless solutions effectively put the RAN in the cloud using software-defined radio and provide scalability and flexibility to the expanding wireless reach of information.

As discussed herein, the end-to-end 5G fixed wireless network 100 solution can operate over the millimeter wave spectrum band and may include commercial indoor and outdoor 5G home routers and Customer Premises Equipment ("CPE"). A 5G Radio Access Network ("RAN") involving a radio access unit and a virtualized RAN incorporates next-generation core technologies and uses Artificial Intelligence-powered 3D radio frequency planning service and tools.

Figure 3:
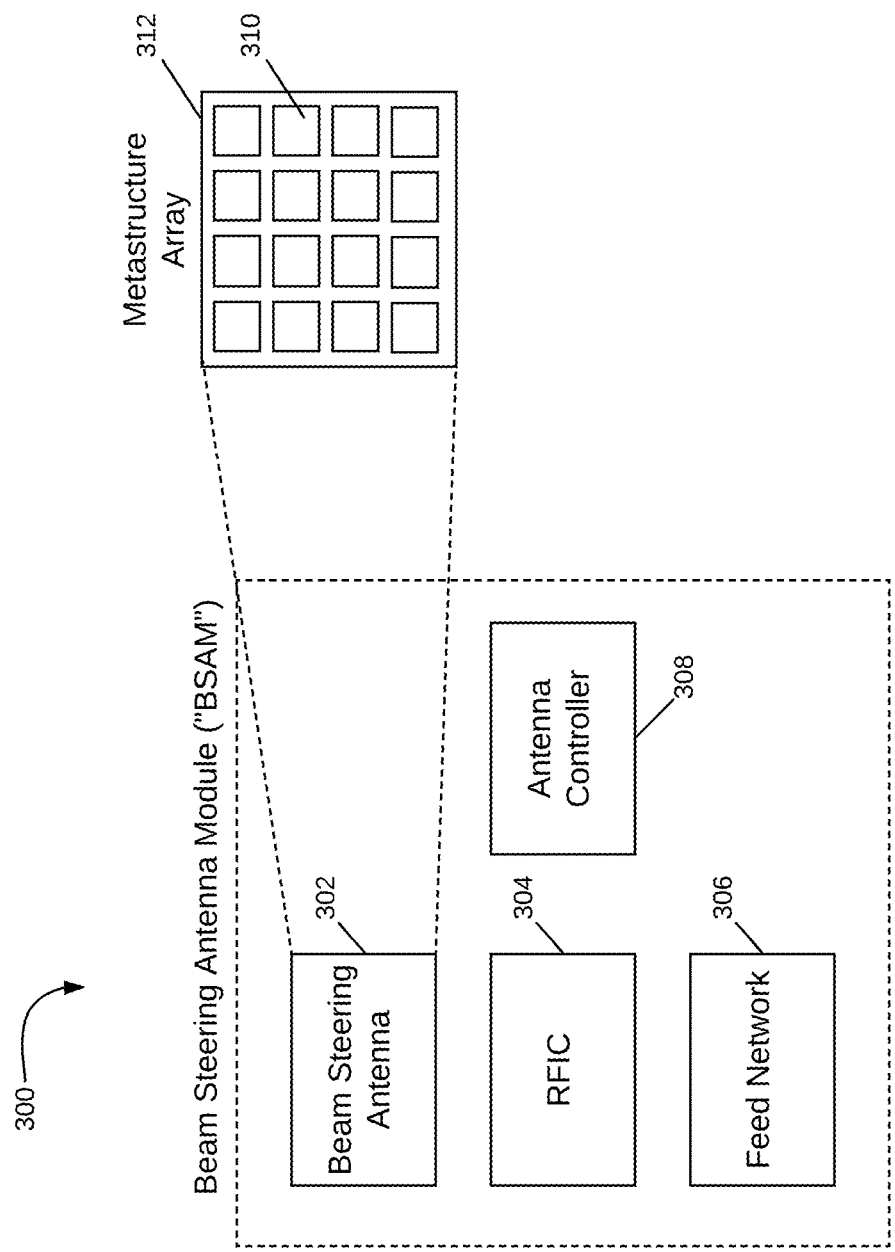
FIG. 3 is a schematic diagram of a Beam Steering Antenna Modules ("BSAM") for use in nodes of a fixed wireless network implemented as in FIG. 1 and in accordance with various examples.

Attention is now directed to FIG. 3, which is a schematic diagram of a BSAM for use in nodes of a fixed wireless network implemented as in FIG. 1 and in accordance with various examples. BSAM 300 includes a Beam Steering Antenna 302, an RF Integrated Circuit ("RFIC") 304 and a feed network 306. An Antenna Controller 308 controls the beam steering antenna 302, creating transmission beams with specified parameters, such as beam width, beam direction, and so forth. As described in more detail below, the antenna controller 308 operates at the direction of an optimal path module that determines the optimal data paths in the fixed wireless network subject to latency, bandwidth, and computational constraints. The optimal path between two nodes guides the antenna controller 308 in the nodes to control their respective beam steering antenna 302 to generate beams at a desired direction in accordance to the optimal path.

In various examples, the beam steering antenna 302 may be a metastructure antenna, a phase array antenna, or any other antenna capable of radiating RF signals in millimeter wave frequencies. A metastructure, as generally defined herein, is an engineered, non- or semi-periodic structure that is spatially distributed to meet a specific phase and frequency distribution. A metastructure antenna is composed of multiple metastructure antenna elements positioned in a metastructure array, as shown with element 310 in metastructure array 312. The metastructure antenna elements may include microstrips, gaps, patches, vias, and so forth. The elements in a given metastructure array may have a variety of shapes and configurations and be designed to meet certain specified criteria, including, for example, desired beam characteristics for a fixed wireless network operating within the 5G standard.

In some examples, the metastructure antenna elements are metamaterial cells in a variety of conductive structures and patterns, such that a received transmission signal is radiated therefrom. Each metamaterial cell may have unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating electromagnetic waves by blocking, absorbing, enhancing, or bending waves.

Active circuit components in RFIC 304 are able to provide RF signals at multiple steering angles to beam steering antenna 302, which then radiates these signals according to their steering angles. The RFIC 304 includes phase shifting circuitry to provide phase shifts to the beam steering antenna elements in a full 360° direction. The phase shifting circuitry may include phase shifters such as a phase shift network, a vector modulator architecture, a varactor-based phase shifter, and so on. The phase shifting circuitry is fed by feed network 306, which is a power divider structure having a plurality of transmission lines for transmitting an RF signal to the phase shifters in RFIC 304.

Figure 4B:
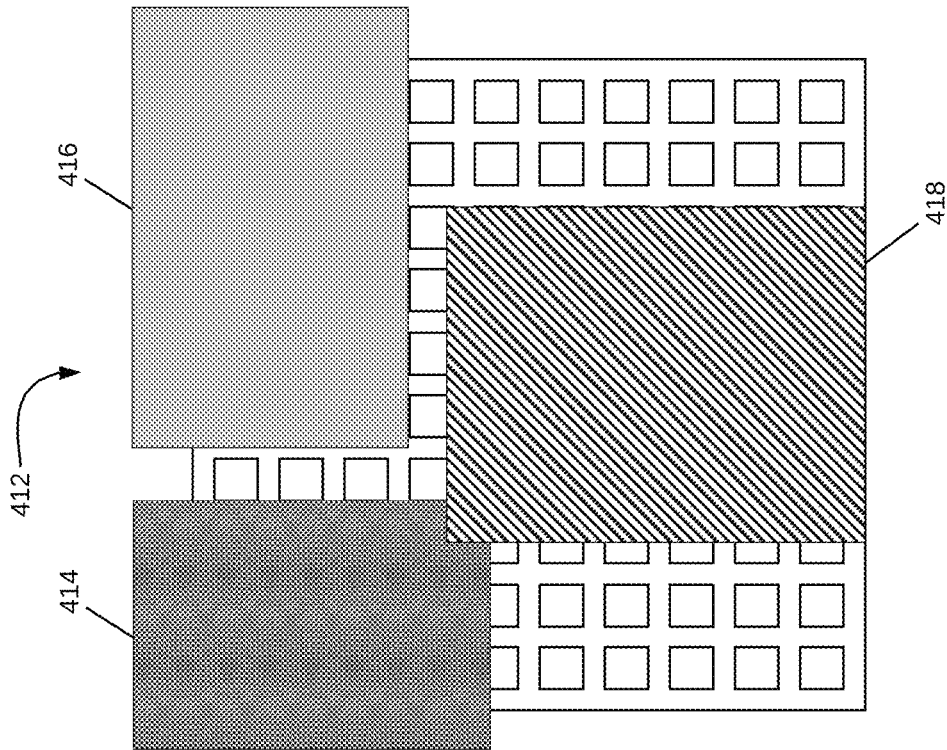
FIGS. 4A-4B are schematic diagram illustrating subarrays of a beam steering antenna in a BSAM implemented as in FIG. 3 and in accordance with various examples.
Figure 4A:
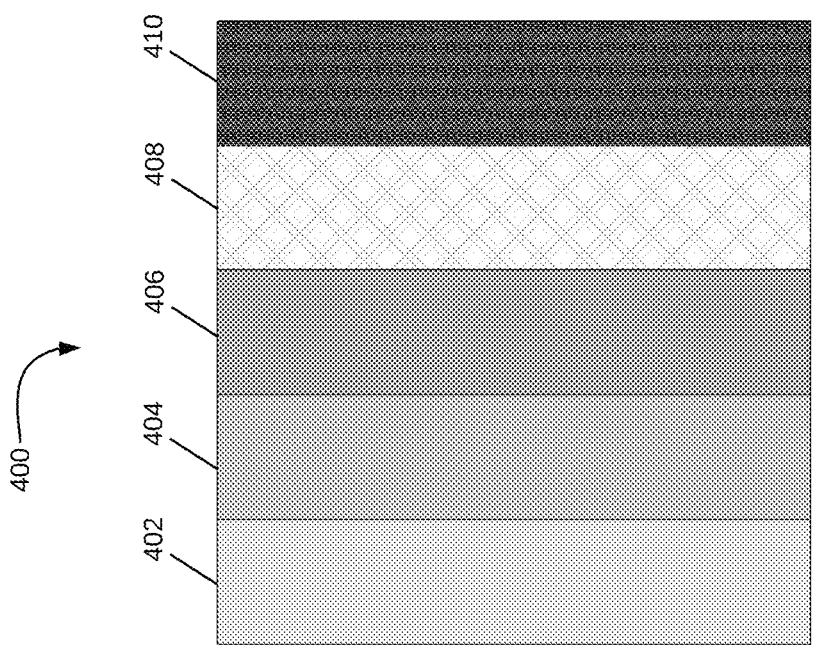

In various examples, the beam steering antenna 302 may be divided into subarrays, such as illustrated in FIGS. 4A-B. In FIG. 4A, antenna array 400 is made up of plurality of metastructure antenna elements which may be dynamically arranged into arrays of multiple elements. In this particular scenario, there are subarrays 402-410, where each subarray generates a specific beam for transmission. These subarrays may operate individually and in coordination with a single beamform. The five subarrays may generate five separate and distinct beams, wherein the shape and direction of each beam is unique. The five separate beams may support transmission of five different and unique transmissions concurrently. FIG. 4B illustrates three other subarrays 414-418 that may be configured in antenna array 412. These subarrays are configured by the antenna controller 308, which controls the signal(s) input to each of the specific subarrays according to a desired phase shift generated by RFIC 304 for one or more of the antenna elements within a subarray. The configuration, arrangement and control of the subarrays is as flexible as the antenna controller 308 and feed network 306 support.

Figure 5:
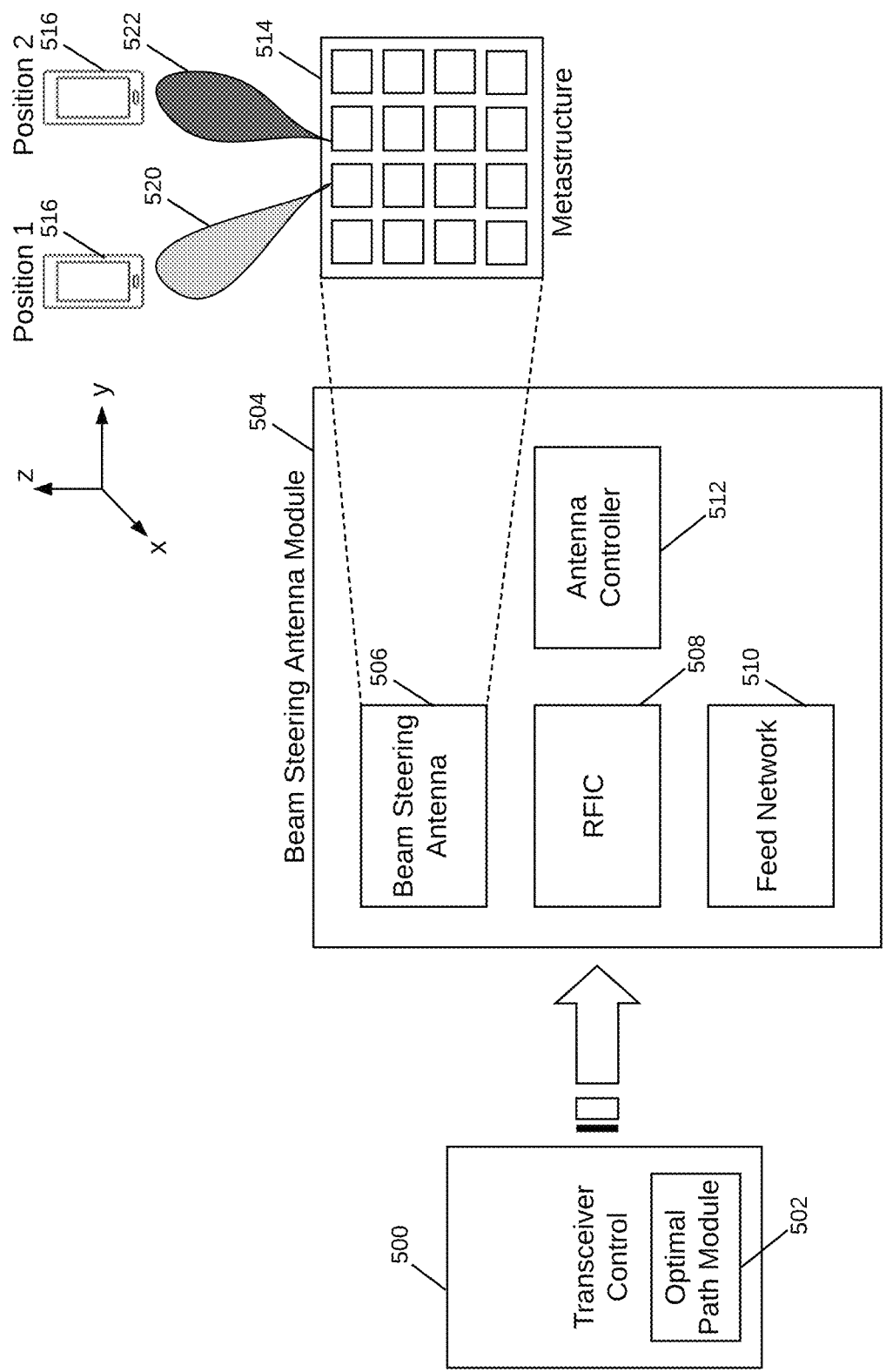
FIG. 5 is a schematic diagram illustrating a transceiver control with an optimal path module for controlling a beam steering antenna implemented as in FIG. 3 and in accordance with various examples.

Attention is now directed at FIG. 5, which illustrates a transceiver control with an optimal path module for controlling a beam steering antenna implemented as in FIG. 3 and in accordance with various examples. Transceiver control 500 is implemented in each node of a fixed wireless network having a BSAM 504, such as in each FWR 114-120 and UE 102-112 in fixed network 100. Transceiver control 500 includes Optimal Path Module ("OPM") 502 for determining the optimal data paths in the fixed wireless network subject to latency, bandwidth, and computational constraints. Based on the determined optimal paths, transceiver control 500 directs the antenna controller 512 within BSAM 504 to achieve a transmission goal by adjusting the beam characteristics, such as shape, direction and so forth. The transmission goal may include communicating to certain nodes in the fixed wireless network at any given time.

For example, consider a node having transceiver control 500. The node is communicating with a UE 516 currently at location $(x_1, y_1, z_1)$ in Position 1. Transceiver control 500 instructs the antenna controller 512 to generate a beam for transmission to this location, and also to prepare to receive signals from this position. As the UE 516 moves, the received signals indicate the new positions of the UE 516. When the UE 516 moves to a new location $(x_2, y_2, z_2)$ in Position 2, the antenna controller 512 receives instructions from transceiver control 500 to adjust the beam of the metastructure antenna array 512 to send a beam to the new locations. As illustrated, the antenna transmission to Position 1 at a time $t_1$ is different than that for Position 2 at a time t2. In this way, the metastructure antenna array 514 generates a first beam directed at Position 1 and a second beam directed at Position 2, wherein these beams may also have different shapes.

Note that communications through a fixed wireless network are routed via the various nodes. For initial set up, the nodes are positioned and then configured by software to adjust the direction of the transmission to a next connection node. In the example above, UE 516 may be in Position 1 within reach of a first FWR, but move to Position 2 within reach of a second FWR. If a node communicating with UE 516 is within the first FWR, the OPM 502 may determine that the optimal path between the node and UE 516 in Position 1 is a direct path between the node and the UE 516. Alternatively, depending on the bandwidth, latency and computational constraints of the fixed network at the time, the optimal path may include the node going through the first FWR before reaching the UE 516. The OPM 502 in the node communicating to the UE 516 will determine a different optimal path when the UE 516 moves from the first to the second FWR.

Figure 6:
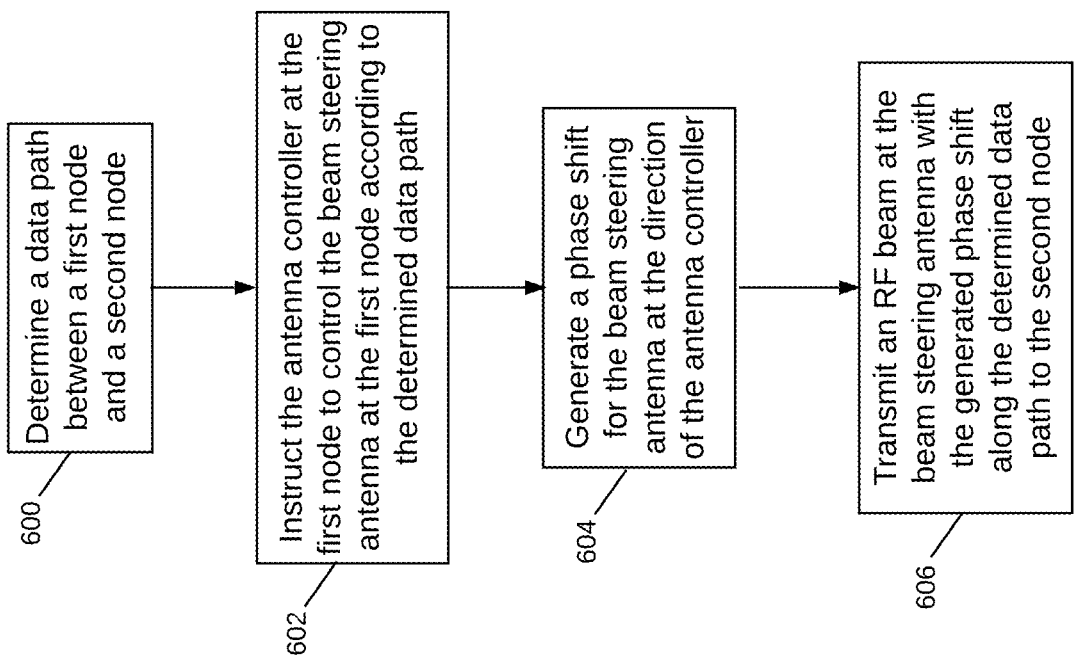
FIG. 6 is a flowchart for communicating between two nodes in a fixed wireless network implemented as in FIG. 1 and in accordance with various examples.

FIG. 6 illustrates a flowchart for communicating between two nodes in a fixed wireless network implemented as in FIG. 1 and in accordance with various examples. First, the OPM 502 determines an optimal data path between a first/source node and a second/target node (600). The transceiver control 500 informs the antenna controller at the first node to control the beam steering antenna at the first node according to the determined optimal data path (602). The RFIC at the BSAM, e.g., RFIC 508 in BSAM 504 of FIG. 5, then generates a phase shift for the beam steering antenna (604). The beam steering antenna transmits an RF beam with the generated phase shift along the determined data path to the second node (606).

Figure 7:
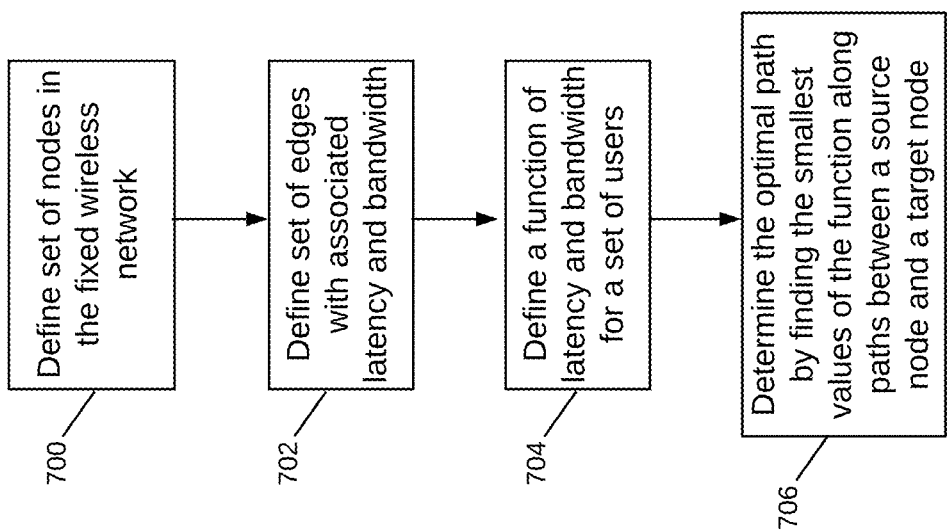
FIG. 7 is a flowchart for assigning paths in a fixed wireless network as in FIG. 1 and in accordance with various examples.

FIG. 7 is a flowchart for determining an optimal path in the OPM 502 illustrated in FIG. 5 and in accordance with various examples. Consider a set of N nodes denoted by $\{\Gamma_i\}$ (700). Between nodes there exist up to N! edges. The edge between $\Gamma_i$ and $\Gamma_j$ is denoted by $\gamma_{ij}$. Each edge has an associated latency $\lambda_{ij}$ and bandwidth $B_{ij}$. Define this set of edges with associated latency and bandwidth values (702). It is assumed here that an arbitrary number of users may be added to a single edge without changing $\lambda_{ik}$, provided that the sum of their bandwidth does not exceed $B_{ij}$. Note that users here denote a requested route between two nodes, which may be FWRs or UE. Two users may share a single high bandwidth edge while connecting between the nodes they desire to connect.

The task for the OPM 502 is to accommodate M users, each of whom desires a connection between a pair of nodes $\Gamma_m^{source}$ and $\Gamma_m^{target}$ with minimum bandwidth $B_m^+$. Assume the existence of a function F, as follows:

$$F(\lambda, B) = \frac{\lambda}{\lambda_0} + \frac{B_0}{\min(B, B_m^*)} \quad \text{(Eq. 1)}$$

where $\lambda_0$ and $B_0$ are constants (704). The specific form of F will depend on a specific fixed wireless application, but will have the general property that lower values are more desirable. The optimal path is determined by finding the smallest values of the function along paths between a source and a target node (706).

There are two stages to accomplish this step. The first stage of the OPM 502 step 706 is a modification of the Dijkstra's Algorithm. First, query $\Gamma^{source}$ for the list of nodes it is connected. Then add each of these nodes to a set referred to herein as the Frontier set. For each element in the Frontier set, look up the latency $\lambda_{ij}$ and bandwidth $B_{ij}$ of the connections to $\Gamma^{source}$ Then assign each node a vector value $[\lambda_{ij}, B_{ij}, P, F(\lambda_{ij}, B_{ij})]$, where $P=[\Gamma^{source}]$ Select the nodes which have the smallest k values of F among the nodes in Frontier, where k is a parameter fed to the OPM 502. Sort these values in order of increasing F. Note that this step is of order O(n), where n≡len(Frontier). Then remove these k elements from the Frontier set.

Consider each of the k nodes identified in the step above. Denote the current node $\Gamma_{current}$. Query $\Gamma_{current}$ to find the nodes which are connected to $\Gamma_{current}$. Assign each node a vector value $[\lambda_{new}, B_{new}, P_{new}, F_{new}]$ unless it has already been assigned a vector with a lower value of F, in which case do nothing. Then add all of these nodes to the Frontier set. The combination rules for successive nodes are as follows:

$$B_{new}=\min(B_1,B_2) \quad \text{(Eq. 2)}$$

$$\lambda_{new}=\lambda_1+\lambda_2 \quad \text{(Eq. 3)}$$

$$P_{new}=P_{old}\cdot\text{append}(\Gamma_{current}) \quad \text{(Eq. 4)}$$

$$F_{new}=F(\lambda_{new},B_{new}) \quad \text{(Eq. 5)}$$

If $\Gamma^{target}$ has an assigned value, return the associated vector. If it is not and the Frontier set is empty, return "No Solution Exists." Otherwise, return to the selection of the k nodes and repeat. Depending upon the size of the fixed wireless network and its computational constraints, at this point it may be possible and desirable to explore suboptimal paths. In order to do this, record the globally optimal solution returned above. For each edge utilized in this solution, set the bandwidth to zero for the selected edge and repeat the above steps. This will force the search algorithm to find alternative routes. For each route with finite associated F, record the route taken and the value F. Sort these routes in order of increasing F.

An extension of the process above which has advantages for large systems is to modify the process to search from both ends. In essence, there are two copies of the above search, one beginning at $\Gamma^{source}$ and one beginning at $\Gamma_{target}$. Once a node has been assigned a value of F by both the source and the target side, and each of these values of F are smaller than any value in the respective Frontiers, then the optimal path has been found.

There are three potential implementations for the second phase of the OPM 502. In the first implementation, it is assumed that the first phase above has been conducted for every user in the fixed wireless network. For each user m, there are a list of paths $P_i^m$ with associated scores $F_i^m$. Define a threshold value of $F=F_m^*$, which represents the maximum acceptable cost for user m. For each user, determine the number of extant paths $n_m$ such that $F<F_m^*$, Sort users in order of increasing $n_m$, so that the users with the fewest acceptable routes go first.

For the first user, assign the optimal path found above. Update the values of $B_{ij}$ along the edges $\lambda_{ij}$ which are traversed by this user to reflect the bandwidth allocated to this user. This transformation is given by:

$$B_{ij}\rightarrow B_{ij}-B_m^* \quad \text{(Eq. 6)}$$

For each subsequent user, repeat the steps to find the optimal path and update the associated values of $B_{ij}$ as described in the transformation of Eq. 6. If there is no possible path, increment the number of excluded users.

In the second implementation, for a small number of users, the first implementation is repeated for every possible ordering of users. The solution with the fewest number of excluded users is returned. If there are no excluded users in more than one solution, return the solution with no excluded users and the lowest value of $\Sigma F_m$.

In the third implementation, choose a random ordering of users and apply the first implementation. Record the number of excluded users and $\Sigma F_m$. As many times as computational constraints permit, permute the ordering of users and repeat the random ordering selection step as many times as possible. The permutations should satisfy the following properties: (a) users that were excluded on the previous pass are given high priority in the subsequent pass; and (b) the current ordering must not have been considered before.

It is appreciated that for a more advanced implementation, a genetic algorithmic approach may be employed to converge on the optimal ordering. The relative cost of $\Sigma F_m$ and the number of excluded users will be determined by the specific problem. Other possible methods for determining the order are in decreasing order of $B_m^*$ so that the difficult-to-fit high bandwidth users are assigned first.

It is also appreciated that placing a BSAM on each node enables a fixed wireless network to self-configure by adjusting the beam direction and coverage area rather than have a manual adjustment. When a node is removed or malfunctioning, the OPM 502 determines an adjustment to the communication paths to maintain coverage where possible. Similarly, when a new node is added, the OPM 502 also reconfigures and determines the optimum paths throughout the network.

Figure 8:
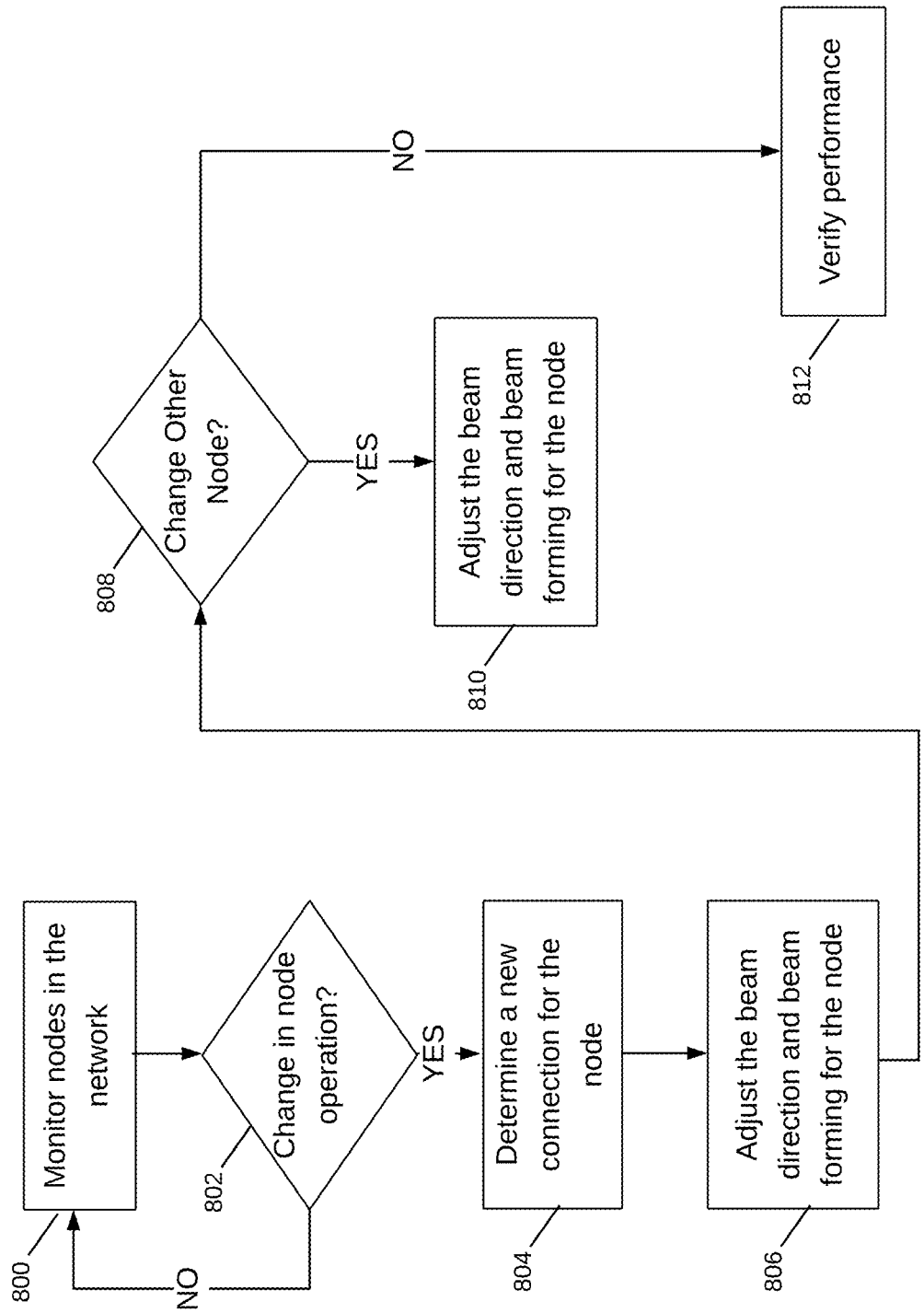
FIG. 8 illustrates a process for monitoring and adjusting a fixed wireless network in accordance with various examples.

FIG. 8 illustrates a process for monitoring and adjusting a fixed wireless network. First, the process monitors nodes in the network (800) and identifies when there is a change in node operation (802). This change may be a malfunctioning node, a node that is taken out of the network, such as for maintenance, and/or a node that is introduced into an existing network. Where there is a change detected, processing continues to determine a new connection for the node within the network. The process determines a best connection for one or more nodes after the change in node operation and instructs an antenna controller at the one or more nodes to adjust transmission characteristics of the antenna such that transmission beams are formed to support the adjusted configuration (804).

The nodes then adjust the beam direction and beam forming characteristics for the one or more node (806). The process continues to determine if other node adjustments are required/desired (808). The process will then either adjust these other nodes (810), or continue to verify performance (812).

In these systems and processes, the beam steering antenna and controller enable the dynamic modification and system self-adjustment. The various examples described herein apply beam steering antennas and controllers to control transmissions enabling advanced communications and expansion of current fixed wireless networks. In some examples, antenna control enables a system to respond to node failures or off-line status events by determining alternate communication paths through the network and adjusting the beams of the active nodes. In some examples, when a new node is added to a network, a process determines how to reconfigure the active antennas to incorporate the additional node and achieve optimum coverage. The control of the nodes may be performed to anticipate a pattern of use, such as where multiple UE are traveling through an area in a particular pattern or at specific times of day. The examples presented herein provide flexibility and automation in communication network design and operation.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A node device in a fixed wireless network, comprising:
a Beam Steering Antenna Module ("BSAM") comprising:
a beam steering antenna configured to generate Radio Frequency ("RF") beams at controlled directions, the RF beams comprising an RF beam and an adjusted RF beam, the beam steering antenna having a plurality of radiating elements;
an antenna controller configured to control the directions of the generated RF beams and adjust the RF beam when a user equipment in the fixed wireless network moves from a first location to a new location, wherein the RF beam that is generated when the user equipment is at the first location and the adjusted RF beam that is generated when the user equipment is at the new location have different shapes; and
a RF Integrated Circuit ("RFIC") configured to generate phase shifts for the RF beam and the adjusted RF beam, the RFIC comprising a phase shifting circuitry comprising a varactor-based phase shifter; and
a transceiver control having an Optimal Path Module ("OPM") configured to determine data paths in the fixed wireless network and direct the antenna controller according to the determined data paths,
wherein the antenna controller operates at a direction of the OPM and wherein an optimal path of the determined data paths guides the antenna controller to control the directions of the RF beam and the adjusted RF beam.

2. The node device of claim 1, wherein the plurality of radiating elements of the beam steering antenna comprises a metastructure antenna having a plurality of meta-structure elements.

3. The node device of claim 1, wherein the antenna controller is further configured to direct the RFIC to generate phase shifts according to the determined data paths.

4. The node device of claim 1, wherein the BSAM further comprises a feed network configured to transmit an RF signal to the RFIC.

5. The node device of claim 1, wherein the optimal data path is subject to a latency, a bandwidth, and computational constraints in the fixed wireless network, wherein the optimal data path is a function of a number of subarrays configurable in the beam steering antenna.

6. The node device of claim 1, wherein the phase shifting circuitry further comprises a phase shift network or a vector modulator architecture.

7. The node device of claim 1, wherein the beam steering antenna comprises at least one of microstrips, gaps, patches, or vias.

8. The node device of claim 1, wherein the beam steering antenna comprises an engineered, non-, or semi-periodic structure.

9. A method for communicating between a first node and a second node in a fixed wireless network, comprising:
determining a data path between the first node and the second node through the fixed wireless network;
instructing an antenna controller at the first node to control a beam steering antenna at the first node according to the determined data path;
generating, via a Radio Frequency Integrated Circuit ("RFIC"), a phase shift for the beam steering antenna at the direction of the antenna controller, wherein the RFIC comprises a phase shifting circuitry comprising a varactor-based phase shifter;
transmitting a Radio Frequency ("RF") beam at the beam steering antenna along the determined data path to the second node when positioned at a first location; and
adjusting the RF beam and transmitting the adjusted RF beam when the second node moves from the first location to a new location, wherein the RF beam being transmitted when the second node is at the first location and the adjusted RF beam being transmitted when the second node is at the new location have different shapes, wherein the RF beam and the adjusted RF beam are transmitted at a guidance of the antenna controller that operates at a direction of an Optimal Path Module ("OPM") configured to determine the data path in the fixed wireless network.

10. The method of claim 9, wherein the RF beam is a combination of beamforms generated by each subarray of the beam steering antenna.

11. The method of claim 9, wherein determining the data path comprises:
defining a set of nodes in the fixed wireless network;
defining a set of edges for the set of nodes with associated latency and bandwidth values;
defining a function of latency and bandwidth for a set of users; and
determining an optimal path by finding smallest values of the function along data paths between the first node and the second node.

12. The method of claim 11, wherein finding the smallest values of the function comprises searching for the optimal path from the first node and from the second node.

13. The method of claim 9, wherein the beam steering antenna comprises a metastructure antenna having an array of meta-structure elements.

14. The method of claim 13, wherein transmitting the RF beam comprises radiating the RF beam from the array of metastructure elements.

15. The method of claim 13, wherein the metastructure antenna comprises a plurality of subarrays, each subarray configured to generate an RF beam at a given controlled direction.

16. The method of claim 9, further comprising:
monitoring a set of nodes in the fixed wireless network to detect a change in operation, the set of nodes including the first node and the second node; and
adjusting a beam direction in the beam steering antenna with the generated phase shift at the first node in response to the change in operation.

17. The method of claim 16, wherein the set of nodes comprises a plurality of Fixed Wireless Radio ("FWR") nodes and a plurality of User Equipment ("UE") nodes.

18. The method of claim 16, wherein monitoring the set of nodes in the fixed wireless network comprises detecting at least one of a malfunctioning node, a node that is taken out of the fixed wireless network, or a node that is introduced into an existing network.

19. The method of claim 9, wherein the phase shifting circuitry further comprises a phase shift network or a vector modulator architecture.

20. The method of claim 9, wherein the beam steering antenna comprises at least one of microstrips, gaps, patches, or vias.

* * * * *